(12) United States Patent
Turner et al.

(10) Patent No.: US 9,267,386 B2
(45) Date of Patent: Feb. 23, 2016

(54) FAIRING ASSEMBLY

(75) Inventors: Matthew A. Turner, Middletown, CT (US); Charles W. Brown, East Hampton, CT (US); Shari L. Bugaj, Haddam, CT (US); Christopher M. Quinn, Middletown, CT (US); David J. Hyland, Portland, CT (US); Andrew G. Alarcon, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 882 days.

(21) Appl. No.: 13/538,021

(22) Filed: Jun. 29, 2012

(65) Prior Publication Data

US 2014/0003958 A1    Jan. 2, 2014

(51) Int. Cl.
*F01D 11/00*    (2006.01)
*F01D 5/30*    (2006.01)

(52) U.S. Cl.
CPC ............ *F01D 11/008* (2013.01); *F01D 5/3007* (2013.01); *F05D 2220/36* (2013.01); *Y02T 50/672* (2013.01)

(58) Field of Classification Search
CPC .............................. F01D 11/008; F01D 11/006
See application file for complete search history.

(56) References Cited

U.S. PATENT DOCUMENTS

| | | |
|---|---|---|
| 2,918,254 A | 12/1959 | Hausammann |
| 3,529,631 A | 9/1970 | Riollet |
| 3,712,757 A | 1/1973 | Goodwin |
| 4,135,857 A | 1/1979 | Pannone et al. |
| 4,371,311 A | 2/1983 | Walsh |
| 4,420,288 A | 12/1983 | Bischoff |
| 4,465,433 A | 8/1984 | Bischoff |
| 4,500,256 A | 2/1985 | Bessay et al. |
| 4,580,946 A | 4/1986 | Bobo |
| 4,621,979 A | 11/1986 | Zipps et al. |
| 4,677,828 A | 7/1987 | Matthews et al. |
| 4,778,338 A | 10/1988 | Bessay |
| 4,832,567 A | 5/1989 | Bessay |
| 4,838,759 A | 6/1989 | Dunn et al. |
| 5,224,831 A | 7/1993 | Hermans et al. |

(Continued)

FOREIGN PATENT DOCUMENTS

| | | |
|---|---|---|
| EP | 1 681 438 A1 | 7/2006 |
| EP | 2267277 A2 | 12/2010 |

(Continued)

OTHER PUBLICATIONS

International Searching Authority, PCT Notification of Transmittal of the International Search Report and the Written Opinion, Apr. 18, 2014, 11 pages.

(Continued)

*Primary Examiner* — Nathaniel Wiehe
*Assistant Examiner* — Michael Sehn
(74) *Attorney, Agent, or Firm* — Kinney & Lange, P.A.

(57) ABSTRACT

A fairing assembly includes an outer wall, a first side wall, a second side wall, and a saddle. The first side wall and the second side wall extend from opposing sides of the outer wall. Together the first side wall, the second side wall, and the outer wall form a cavity within the fairing assembly. The saddle is positioned within the cavity and extends between the first side wall and the second side wall. The saddle has a first rib adapted to connect to the first side wall and a second rib adapted to connect to the second side wall. The first rib and the second rib connect together at a central hub.

17 Claims, 6 Drawing Sheets

(56) References Cited

U.S. PATENT DOCUMENTS

| | | | |
|---|---|---|---|
| 5,382,096 | A | 1/1995 | Stein et al. |
| 5,397,215 | A | 3/1995 | Spear et al. |
| 5,466,123 | A | 11/1995 | Rose |
| 5,554,000 | A | 9/1996 | Katoh et al. |
| 5,890,874 | A | 4/1999 | Lambert et al. |
| 5,957,658 | A | 9/1999 | Kasprow et al. |
| 6,017,186 | A | 1/2000 | Hoeger et al. |
| 6,146,089 | A | 11/2000 | Allen et al. |
| 6,158,961 | A | 12/2000 | Kehl et al. |
| 6,213,711 | B1 | 4/2001 | Muller et al. |
| 6,217,283 | B1 | 4/2001 | Ravenhall et al. |
| 6,276,897 | B1 | 8/2001 | Tarada |
| 6,283,713 | B1 | 9/2001 | Harvey et al. |
| 6,338,611 | B1 | 1/2002 | Anderson et al. |
| 6,419,446 | B1 | 7/2002 | Kvasnak et al. |
| 6,447,250 | B1 | 9/2002 | Corrigan et al. |
| 6,457,942 | B1 | 10/2002 | Forrester |
| 6,471,474 | B1 | 10/2002 | Mielke et al. |
| 6,478,539 | B1 | 11/2002 | Trutschel |
| 6,478,545 | B2 | 11/2002 | Crall et al. |
| 6,481,971 | B1 | 11/2002 | Forrester |
| 6,511,294 | B1 | 1/2003 | Mielke et al. |
| 6,520,742 | B1 | 2/2003 | Forrester et al. |
| 6,524,070 | B1 | 2/2003 | Carter |
| 6,561,761 | B1 | 5/2003 | Decker et al. |
| 6,579,061 | B1 | 6/2003 | Heyward et al. |
| 6,634,863 | B1 | 10/2003 | Forrester et al. |
| 6,669,445 | B2 | 12/2003 | Staubach et al. |
| 6,672,832 | B2 | 1/2004 | Leeke et al. |
| 6,705,834 | B1 | 3/2004 | Jacobsson |
| 6,786,698 | B2 | 9/2004 | Warner et al. |
| 6,830,432 | B1 | 12/2004 | Scott et al. |
| 6,857,853 | B1 | 2/2005 | Tomberg et al. |
| 6,969,232 | B2 | 11/2005 | Zess et al. |
| 7,080,974 | B2 | 7/2006 | Lejars et al. |
| 7,134,842 | B2 | 11/2006 | Tam et al. |
| 7,195,454 | B2 | 3/2007 | Lu et al. |
| 7,217,096 | B2 | 5/2007 | Lee |
| 7,220,100 | B2 | 5/2007 | Lee et al. |
| 7,249,933 | B2 | 7/2007 | Lee et al. |
| 7,354,243 | B2 | 4/2008 | Harvey |
| 7,465,155 | B2 | 12/2008 | Nguyen |
| 7,484,935 | B2 | 2/2009 | Heitland et al. |
| 7,553,125 | B2 | 6/2009 | Audic et al. |
| 7,637,010 | B2 | 12/2009 | Burgess et al. |
| 7,690,890 | B2 | 4/2010 | Aotsuka et al. |
| 7,739,865 | B2 | 6/2010 | Prasad et al. |
| 7,841,828 | B2 | 11/2010 | Liang |
| 7,874,794 | B2 | 1/2011 | Solomon et al. |
| 7,887,297 | B2 | 2/2011 | Allen-Bradley et al. |
| 8,061,980 | B2 | 11/2011 | Praisner et al. |
| 8,070,438 | B2 | 12/2011 | Evans |
| 8,105,019 | B2 | 1/2012 | McCaffrey et al. |
| 8,113,785 | B2 | 2/2012 | Forgue et al. |
| 8,192,153 | B2 | 6/2012 | Harvey et al. |
| 8,202,043 | B2 | 6/2012 | McCaffrey |
| 8,206,115 | B2 | 6/2012 | Gupta et al. |
| 8,246,310 | B2 | 8/2012 | Pierrot et al. |
| 8,297,935 | B2 | 10/2012 | Mtilin et al. |
| 8,342,803 | B2 | 1/2013 | Grohens et al. |
| 8,348,619 | B2 | 1/2013 | Derclaye et al. |
| 2006/0272407 | A1 | 12/2006 | Audic et al. |
| 2007/0258818 | A1 | 11/2007 | Allen-Bradley et al. |
| 2008/0135530 | A1 | 6/2008 | Lee et al. |
| 2008/0267772 | A1 | 10/2008 | Harvey et al. |
| 2008/0273980 | A1 | 11/2008 | Belmonte et al. |
| 2009/0035130 | A1 | 2/2009 | Sonoda et al. |
| 2009/0053066 | A1 | 2/2009 | Iida |
| 2009/0148282 | A1 | 6/2009 | McCaffrey et al. |
| 2010/0080708 | A1 | 4/2010 | Gupta et al. |
| 2010/0143139 | A1 | 6/2010 | Pandey et al. |
| 2010/0150724 | A1* | 6/2010 | Forgue et al. ............. 416/219 R |
| 2010/0166558 | A1 | 7/2010 | Siden et al. |
| 2010/0172749 | A1 | 7/2010 | Mitsuhashi et al. |
| 2010/0196154 | A1 | 8/2010 | Sakamoto et al. |
| 2010/0254797 | A1 | 10/2010 | Grover et al. |
| 2010/0274818 | A1 | 10/2010 | Chauvin et al. |
| 2010/0284818 | A1 | 11/2010 | Sakamoto et al. |
| 2011/0014056 | A1 | 1/2011 | Guimbard et al. |
| 2011/0033292 | A1 | 2/2011 | Huth |
| 2011/0038731 | A1 | 2/2011 | Evans |
| 2011/0044818 | A1 | 2/2011 | Kuhne et al. |
| 2011/0110788 | A1 | 5/2011 | Guimbard et al. |
| 2011/0123322 | A1 | 5/2011 | Allen-Bradley et al. |
| 2011/0189023 | A1 | 8/2011 | Guimbard et al. |
| 2011/0223005 | A1 | 9/2011 | Lee et al. |
| 2011/0236200 | A1 | 9/2011 | Grover et al. |
| 2011/0243749 | A1 | 10/2011 | Praisner et al. |
| 2012/0014776 | A1 | 1/2012 | Fulayter et al. |
| 2012/0121384 | A1 | 5/2012 | Borufka et al. |
| 2012/0201688 | A1 | 8/2012 | Mahle et al. |
| 2012/0201692 | A1 | 8/2012 | Boston et al. |
| 2012/0251312 | A1 | 10/2012 | Johann et al. |
| 2012/0251324 | A1 | 10/2012 | Johann et al. |
| 2012/0251325 | A1 | 10/2012 | Dunkel et al. |
| 2012/0263587 | A1 | 10/2012 | Hergt et al. |
| 2012/0269619 | A1 | 10/2012 | Johann |
| 2013/0004331 | A1 | 1/2013 | Beeck |

FOREIGN PATENT DOCUMENTS

| | | | |
|---|---|---|---|
| EP | 2 447 476 | A2 | 5/2012 |
| FR | 144526 | A | 6/1966 |
| GB | 2 042 675 | A | 9/1980 |
| GB | 2 388 162 | A | 11/2003 |
| WO | WO 2010/068391 | A2 | 6/2010 |
| WO | WO 2012/007716 | A1 | 1/2012 |

OTHER PUBLICATIONS

M. G. Rose, "Non-Axisymmetric Endwall Profiling in the HP NGV's of an Axial Flow Gas Turbine", ASME 94-GT-249, presented at the Int'l. Gas Turbine and Aeroengine Congress and Exposition, Jun. 13-16, 1994, 8 pages.

Dr. N. W. Harvey, et al., "Non-Axisymmetric Turbine End Wall Design: Part I Three-Dimensional Linear Design System", ASME 99-GT-337, presented at Int'l Gas Turbine and Aeroengine Congress and Exhibiton, Jun. 7-10, 1999, 9 pages.

J. C. Hartland, et al., "Nonaxisymmetric Turbine End Wall Design: Part II—Experimental Validation", from Journal of Turbomachinery, vol. 122, Apr. 2000, pp. 286-293.

N. W. Harvey, et al., "Improving Turbine Efficiency Using Non-Axisymmetric End Walls: Validation in the Multi-Row Environment and with Low Aspect Ratio Blading", ASME GT-2002-30337, proceedings of ASME Turbo Expo 2002, 8 pages.

N. W. Harvey, et al., "Nonaxisymmetric Turbine End Wall Design: Part I—Three-Dimensional Linear Design System", rom Journal of Turbomachinery, vol. 122, Apr. 2000, pp. 278-285.

G. Ingram, et al., "The Effect of End-Wall Profiling on Secondary Flow and Loss Development in a Turbine Cascade", ASME GT-2002-30339, proceedings of ASME Turbo Expo 2002, Jun. 3-6, 2001, pp. 135-145.

G. Brennan, et al., "Improving the Efficiency of the Trent 500-HP Turbine Using Nonaxisymmetric End Walls—Part I: Turbine Design", from Journal of Turbomachinery, vol. 125, Jul. 2003; pp. 497-504.

M. Hoeger, et al., "On the Performance of Compressor Blades with Contoured Endwalls", from http://www.mtu.de/en/technologies/engineering_news/development/Hoeger_Performance_of_compressor_blades_en.pdf, accessed Jan. 7, 2013, 10 pages.

L. Fengjun, et al., "Bowed and Twisted Blade Influence on a Turbine Three Dimensional Pressure Field", from Journal of Engineering Thermophysics, vol. 17 Suppl., Dec. 1996, 10 pages.

S. Jiexian et al., "Application of a Bowed Blade in a Compressor", from Journal of Engineering Thermophysics, vol. 11, No. 4, Nov. 1990, 9 pages.

S. Jiexian et al., "Bowed and Twisted Compound Blade Control of Secondary Flow", from Journal of Aerospace Power, vol. 6, No. 4, Oct. 1991, 5 pages.

European Patent Office, extended European search report, Jul. 20, 2015, 6 pages.

* cited by examiner

FAIRING ASSEMBLY

BACKGROUND

The present invention relates to gas turbine engines, and more particularly to fairing assemblies for a fan section of gas turbine engines.

Gas turbine engines, such as turbofan engines for an aircraft, include a fan section, a compression section, a combustion section, and a turbine section. A primary flow path for working medium flow gases extends axially through the sections of the engine. A secondary flow path (bypass) for flow gases extends parallel to and radially outward of the primary flow path and passes through the fan section.

The fan section includes a rotor assembly and a stator assembly. The rotor assembly of the fan includes a fan hub and a plurality of outwardly extending airfoils. Each airfoil includes a blade portion, a root portion, and a fairing assembly. The blade portion of the airfoil extends through the flow path and interacts with the gases passing therethrough to transfer energy between the rotor assembly and the gases. The fairing assembly typically extends circumferentially from the rotor blade to an adjacent rotor blade and is disposed radially between the blade portion and the root portion. The stator assembly includes a fan case, which circumscribes the rotor assembly in close proximity to the tips of the blades.

During operation, the fan draws the gases (air) into the engine. The fan (driven by the turbine) raises the pressure of this air, thus producing useful thrust. Improvements in fan performance depend in many cases on reducing fluid flow leakage at various points in the fan. One of these places is between adjacent fan blades at the inner radial portions thereof near the fan hub. Typically, fairing assemblies are utilized to seal this gap and to form the inner fan air flow path between the fan blades. Indeed, the gap must be sealed to prevent leakage recirculation from the blade trailing edge forward and up through the gap into the fan flow path.

Traditionally, fairing assemblies were created from stock along with the fan blade. Rubber flap seals were then used to seal the gaps between adjacent fairing assemblies. However, as fan blades are typically constructed of alloys, machining the fairing assembly from stock is expensive and time consuming. Thus, alternative fairing assembly designs have been developed. These alternatives typically use a fairing assembly that is separate from the blade and hub. This alternative design is constructed of composite materials that require complex tooling designs and/or complicated molding processes.

SUMMARY

A fairing assembly includes an outer wall, a first side wall, a second side wall, and a saddle. The first side wall and the second side wall extend from opposing sides of the outer wall. Together the first side wall, the second side wall, and the outer wall form a cavity within the fairing assembly. The saddle is positioned within the cavity and extends between the first side wall and the second side wall. The saddle has a first rib adapted to connect to the first side wall and a second rib adapted to connect to the second side wall. The first rib and the second rib connect together at a central hub.

A fan assembly includes a hub, a pin, and a fairing assembly. The hub has one or more tabs extending therefrom and each tab has an aperture extending therethrough. The pin is received in the aperture of each tab. The fairing assembly is mounted to the hub and has one or more saddles that are adapted to receive both the one or more tabs and the pin to mount the fairing assembly to the hub.

A gas turbine engine includes a fan hub, a pin, and a fairing assembly. The hub has one or more tabs extending therefrom and each tab has an aperture extending therethrough. The pin is received in the aperture of each tab. The fairing assembly is mounted to the hub and has one or more saddles that are adapted to receive both the one or more tabs and the pin to mount the fairing assembly to the hub.

DETAILED DESCRIPTION

The invention relates to a fairing assembly design for the fan section of a gas turbine engine. The fairing assembly is adapted to mount on a hub and seal a gap between the inner radial portions of fan blades, thereby forming the inner fan air flow path between the fan blades. More particularly, fairing assembly includes one or more saddles that are adapted to receive both the one or more tabs and a pin to mount the fairing assembly to the hub. Incorporating the saddle into the fairing assembly allows fairing assembly to be a self supporting structure. Thus, during operation all of the loads the fairing assembly is subjected to are carried by the walls of the platform assembly without further internal support. Saddles allow fairing assembly to have a hollow interior, thereby reducing the weight of the fairing assembly and the gas turbine engine when compared to conventional designs. Additionally, saddles allow for a simplified wall design, and thereby, facilitate more rapid and simplified layup and manufacture of the fairing assembly.

Figure 1:
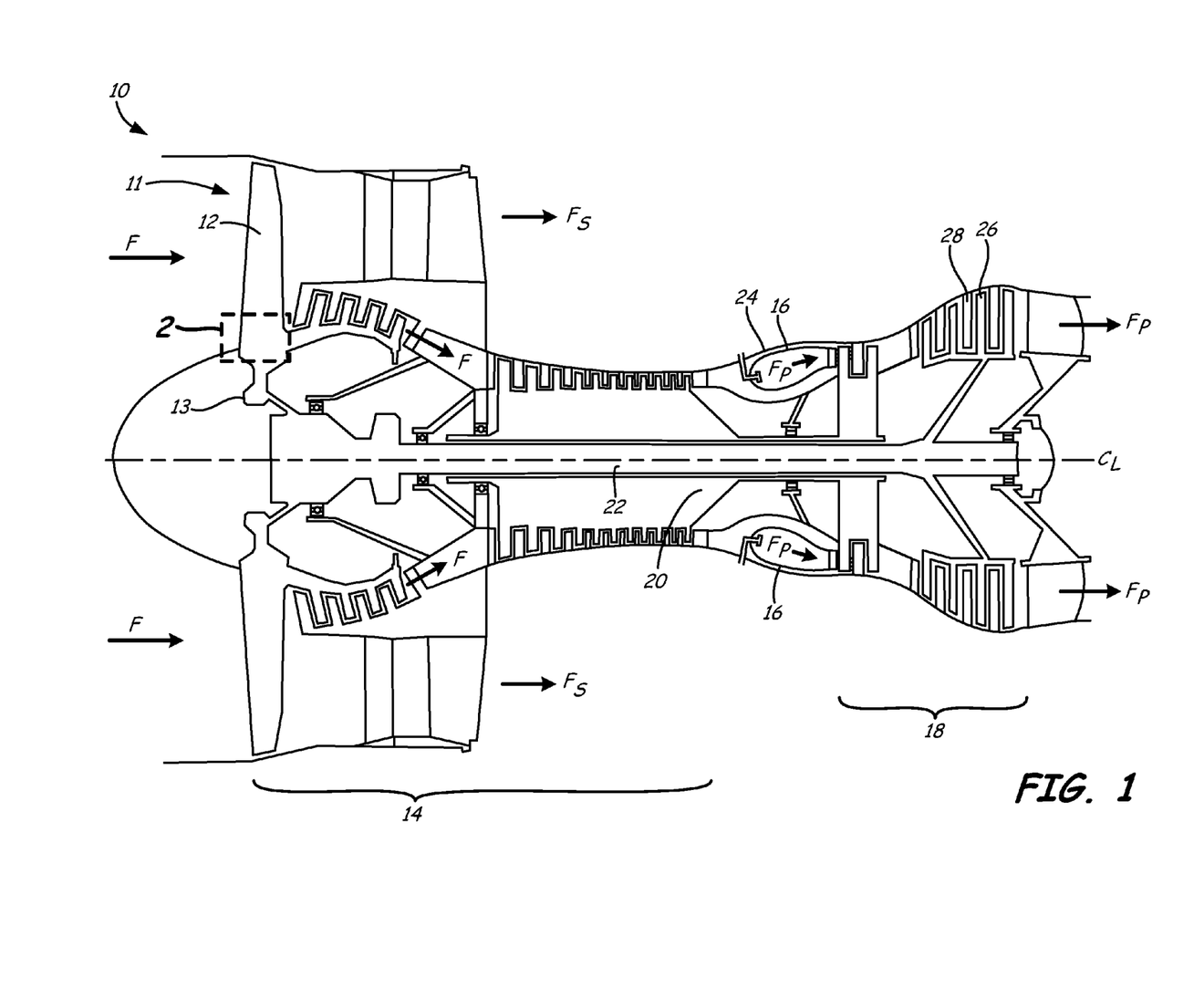
FIG. 1 is a longitudinal sectional view along an engine center line of a gas turbine engine.

FIG. 1 is a representative illustration of a gas turbine engine 10 including a fan assembly 11 embodying the present invention. The view in FIG. 1 is a longitudinal sectional view along an engine center line. FIG. 1 shows gas turbine engine 10 including a fan blade 12 and a fan hub 13, a compressor 14, a combustor 16, a turbine 18, a high-pressure rotor 20, a low-pressure rotor 22, and an engine casing 24. Turbine 18 includes rotor stages 26 and stator stages 28.

As illustrated in FIG. 1, fan blade 12 extends from fan hub 13, which is positioned along engine center line $C_L$ near a forward end of gas turbine engine 10. Compressor 14 is adjacent fan hub 13 along engine center line $C_L$, followed by combustor 16. Turbine 18 is located adjacent combustor 16, opposite compressor 14. High-pressure rotor 20 and low-pressure rotor 22 are mounted for rotation about engine center line $C_L$. High-pressure rotor 20 connects a high-pressure section of turbine 18 to compressor 14. Low-pressure rotor 22 connects a low-pressure section of turbine 18 to fan hub 13. Rotor stages 26 and stator stages 28 are arranged throughout turbine 18 in alternating rows. Rotor stages 26 connect to high-pressure rotor 20 and low-pressure rotor 22. Engine casing 24 surrounds turbine engine 10 providing structural support for compressor 14, combustor 16, and turbine 18, as well as containment for cooling air flows, as described below.

In operation, air flow F enters compressor 14 after passing between fan blades 12. Air flow F is compressed by the rotation of compressor 14 driven by high-pressure rotor 20. The compressed air from compressor 14 is divided, with a portion going to combustor 16, and a portion employed for cooling components exposed to high-temperature combustion gases. Compressed air and fuel are mixed and ignited in combustor 16 to produce high-temperature, high-pressure combustion gases Fp. Combustion gases Fp exit combustor 16 into turbine section 18. Stator stages 28 properly align the flow of combustion gases Fp for an efficient attack angle on subsequent rotor stages 26. The flow of combustion gases Fp past rotor stages 26 drives rotation of both high-pressure rotor 20 and low-pressure rotor 22. High-pressure rotor 20 drives a high-pressure portion of compressor 14, as noted above, and low-pressure rotor 22 drives fan blades 12 via fan hub 13 to produce thrust Fs from gas turbine engine 10. Although embodiments of the present invention are illustrated for a turbofan gas turbine engine for aviation use, it is understood that the present invention applies to other aviation gas turbine engines and to industrial gas turbine engines as well.

Figure 2:
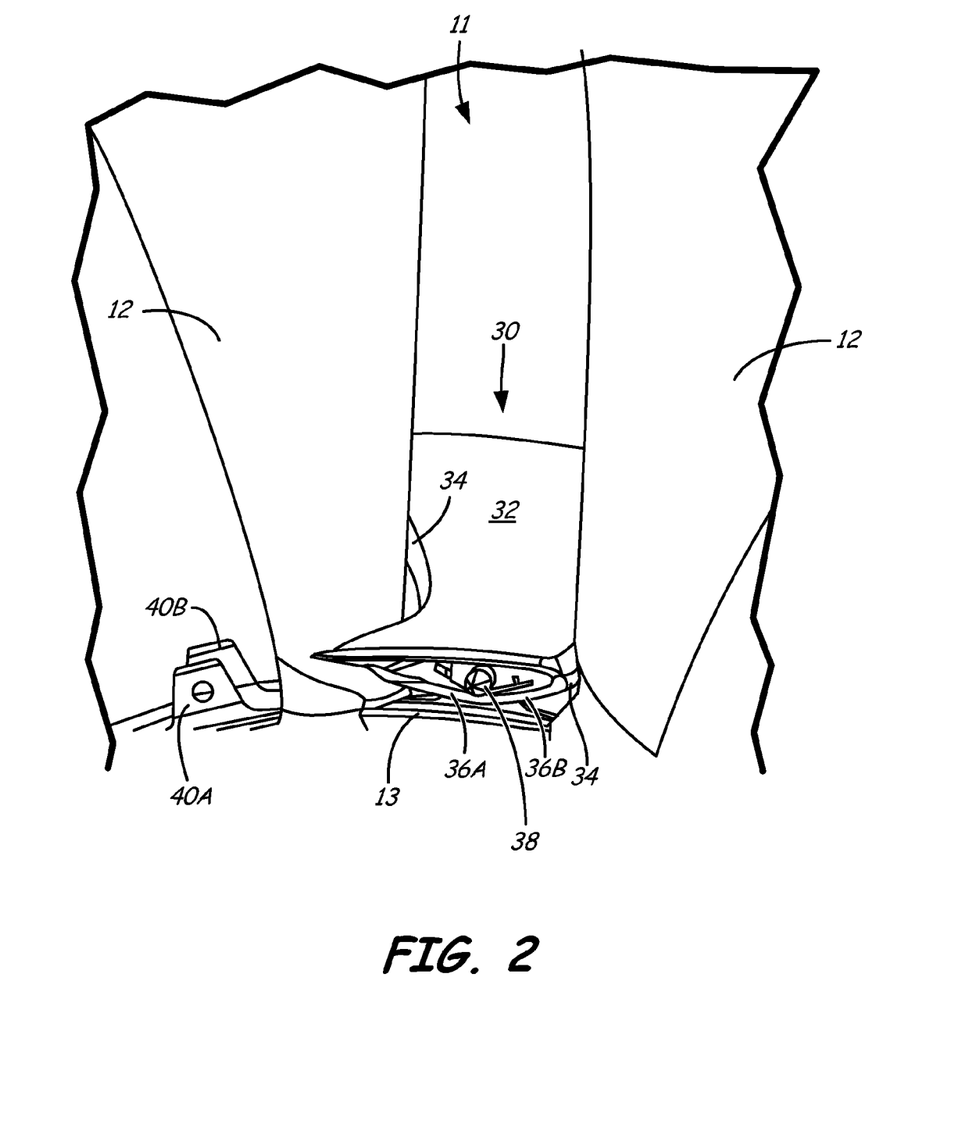
FIG. 2 is an elevated perspective view of a partially assembled portion of fan assembly including a fairing assembly mounted to a hub between adjacent fan blades.

FIG. 2 shows a perspective view of fan assembly 11. In addition to hub 13 and blades 12, fan assembly 11 includes fairing assembly 30 and pin 38. Fairing assembly 30 includes an outer wall 32, seals 34, and first and second side walls 36A and 36B. Hub 13 includes first and second tabs 40A and 40B.

As shown in FIG. 2, blades 12 are mounted to and extend from hub 13. Blades 12 comprise an array of a plurality of blades, which form flow passages therebetween. Fairing assemblies 30 (only one is shown in FIG. 2) are disposed in an inner radial portion of flow passages between adjacent blades 12 and extend substantially the entire length of blades 12. In the embodiment shown, fairing assembly 30 is mounted to hub 13. In particular, outer wall 32 extends between blades 12 and comprises a platform that forms an inner radial flow surface of the flow passage between blades 12. Seals 34 are disposed between fairing assembly 30 and blades 12. Seal 34 can be constructed of elastomeric material such as rubber or other suitable materials.

First and second side walls 36A and 36B connect to and extend from opposing sides of outer wall 32. Thus, first side wall 36A is disposed adjacent a suction side of a first blade and second side wall 36B is disposed adjacent a pressure side of a second blade. First and second side walls 36A and 36B extend toward one another and toward hub 13 in general, and are disposed about first and second tabs 40A and 40B.

A pin 38 extends through fairing assembly 30 and is received in tabs 40A and 40B. More particularly, pin 38 extends below outer wall 32 and between first and second side walls 36A and 36B. As will be describe subsequently, fairing assembly 30 has one or more saddles (not shown) that are adapted to receive both first and second tabs 40A and 40B and pin 38 to mount the fairing assembly 30 to the hub 13.

Fairing assembly 30 acts in concert (along with seals 34) to seal the gap between the inner radial portions of blades 12 adjacent hub 13 to form the inner fan air flow path between blades 12. Thus, fairing assembly 30 prevents leakage recirculation from the blade trailing edge forward to blade leading edges adjacent hub 13.

Figure 3A:
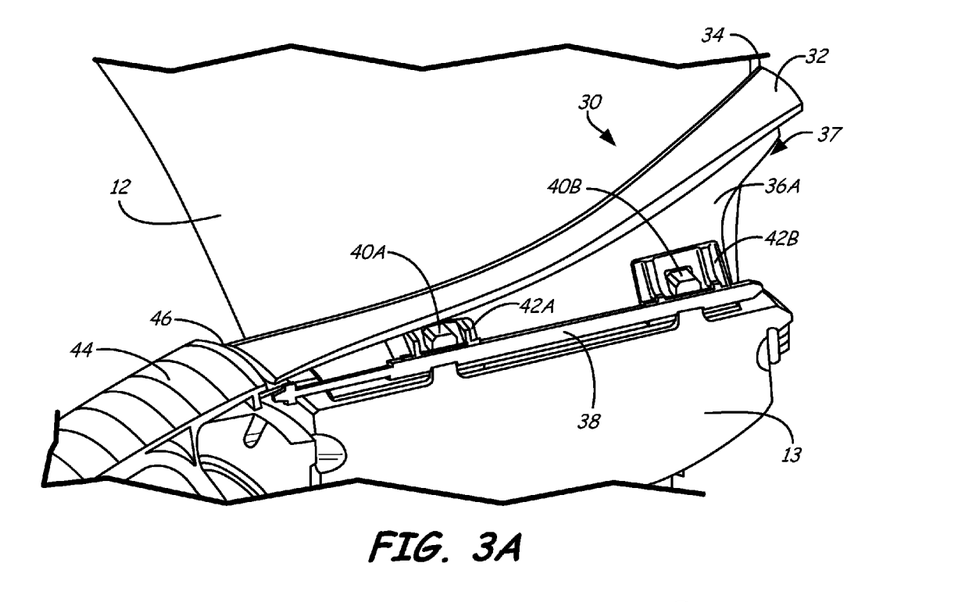
FIGS. 3A and 3B are cross-sectional views of one embodiment of the fairing assembly including saddles that are mounted to a pin.
Figure 3B:
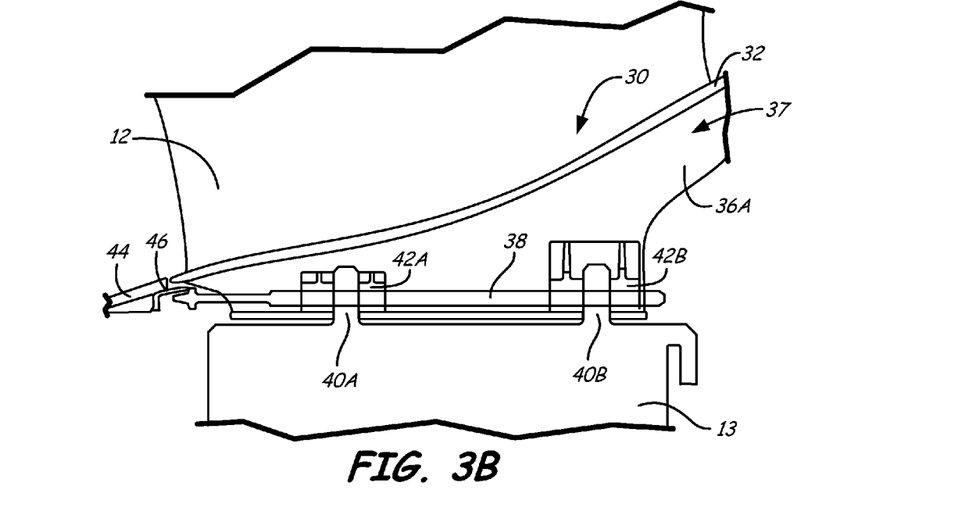

FIGS. 3A and 3B show cross-sectional views of one embodiment of fairing assembly 30 as well as portions of gas turbine engine 10 (FIG. 1) such as spinner 44 and shoulder 46. Fairing assembly 30 includes outer wall 32, seals 34, and first and second side walls 36A and 36B (FIG. 2), and additionally illustrates first and second saddles 42A and 42B. FIGS. 3A and 3B additionally show pin 38 and tabs 40A and 40B.

Outer wall 32 extends to seals 34 along blade 12. First side wall 36A connects to outer wall 32 and extends away from blade 12 toward pin 38 and a rim of hub 13. Together outer wall 32 and first and second side walls 36A and 36B (FIG. 2) form cavity 37 that extends from a forward portion of hub 13 to an aft portion of hub 13. Pin 38 extends through cavity 37 from a forward portion of hub 13 to an aft portion of hub 13. Spinner 44 is disposed forward of hub 13 and is connected thereto. Shoulder 46 is connected to spinner 44 and interfaces with pin 38. Shoulder 46 provides a stop to limit travel of the pin 38 in the forward direction.

As shown in FIGS. 3A and 3B, first side wall 36A does not contact a rim of hub 13 but is supported at a distance therefrom by saddles 42A and 42B and pin 38. In particular, first and second saddles 42A and 42B are designed to mount around tabs 40A and 40B and receive pin 38 therein. Thus, pin 38 extends through first and second saddles 42A and 42B. First and second saddles 42A and 42B are disposed within cavity 37 about tabs 40A and 40B. First and second saddles 42A and 42B are connected to first side wall 36A as well as second side wall 36B (FIG. 2). Thus, first and second saddles 42A and 42B extend between first and second side walls 36A and 36B.

In one embodiment, saddles 42A and 42B are formed separately from outer wall 32 and side walls 36A and 36B and are formed using known means such as injection molding. In the embodiment shown in FIGS. 3A and 3B, saddles 42A and 42B are formed of light weight composite materials such as an epoxy reinforced with carbon fiber. In one embodiment, saddles 42A and 42B are connected to side walls 36A and 36B by a secondary bond utilizing adhesives such as epoxy adhesives, urethane adhesives, or the like.

First and second saddles 42A and 42B allow fairing assembly 30 to have a hollow interior cavity 37, thereby reducing the weight of fairing assembly 30 and the gas turbine engine 10 (FIG. 1) when compared to conventional designs. Additionally, first and second saddles 42A and 42B allow for a simplified wall design, and thereby, facilitate more rapid and simplified layup and manufacture of platform assembly 30.

Figure 4A:
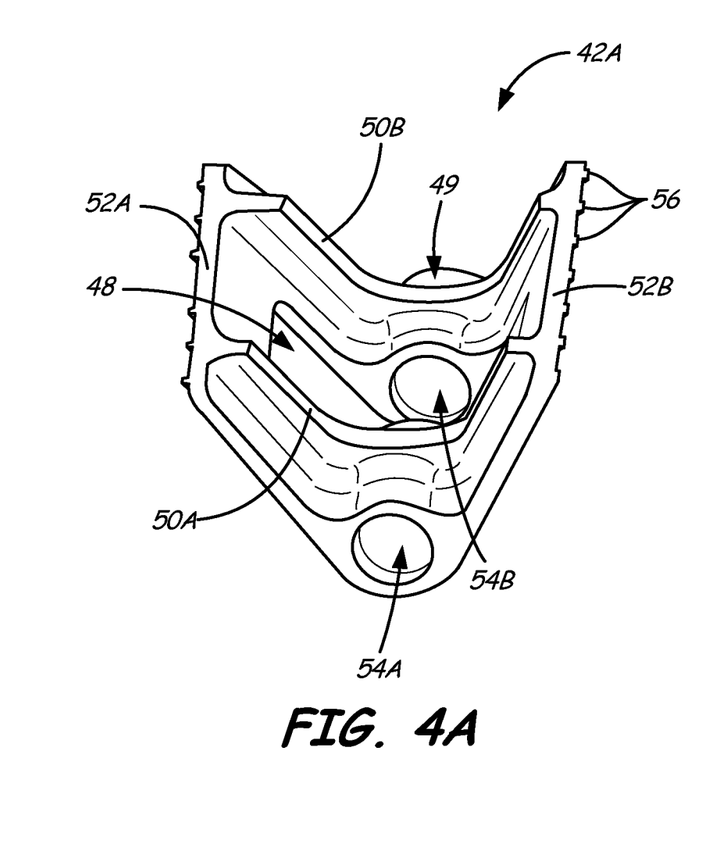
FIGS. 4A and 4B are perspective views of the saddle of FIGS. 3A and 3B.
Figure 4B:
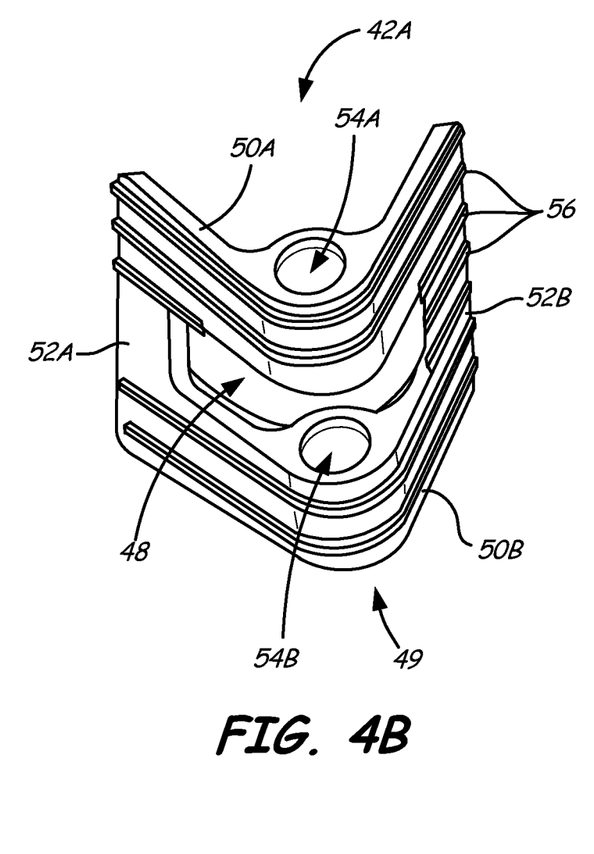

FIGS. 4A and 4B show one embodiment of saddle 42A. Saddle 42A includes an opening 48, central hub 49, first and second ribs 50A and 50B, linkages 52A and 52B, apertures 54A and 54B, and features 56.

Opening 48 divides central hub 49 and is disposed between first and second ribs 50A and 50B. First and second ribs 50A and 50B extend in a general V-shape from central hub 49. First and second ribs 50A and 50B are connected by linkages 52A and 52B. Apertures 54A and 54B extend through central hub 49 and can be co-molded or post machined into saddle 42A. Features 56 extend along an outer surface of first and second ribs 50A and 50B as well as linkages 52A and 52B.

Opening 48 is adapted to receive tabs 40A and 40B (FIGS. 3A and 3B) therein. Linkages 52A and 52B are adapted to extend along and mount onto side walls 36A and 36B. Apertures 54A and 54B of central hub 49 are adapted to receive pin 38 (FIGS. 3A and 3B) therein to mount fairing assembly 30 to hub 13. Features 56 facilitate bonding of first saddle 42A to first side wall 36A and second side wall 36B.

Figure 5A:
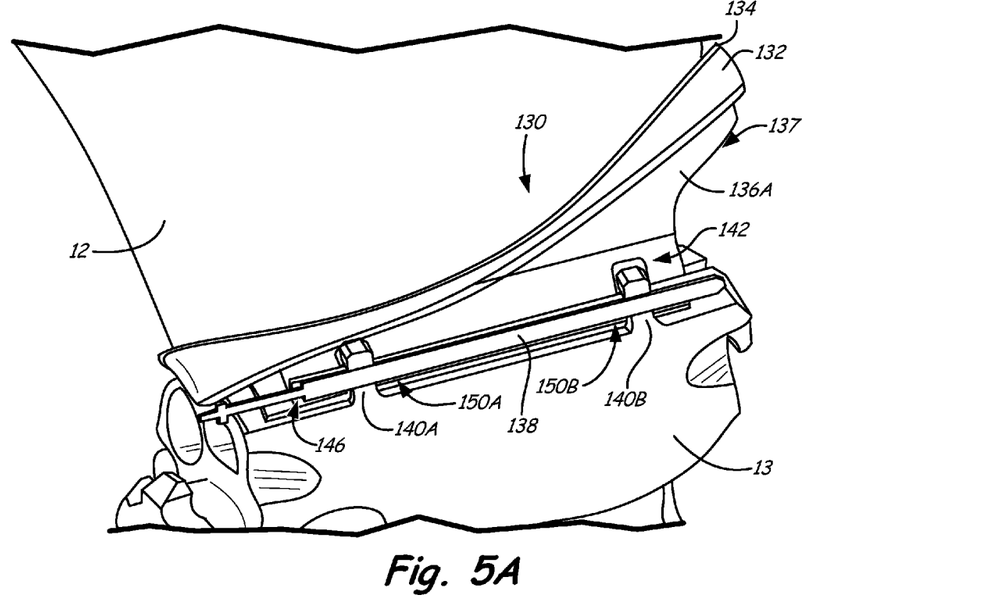
FIGS. 5A and 5B are cross-sectional views of a second embodiment of the fairing assembly including a single mounted to a pin.
Figure 5B:
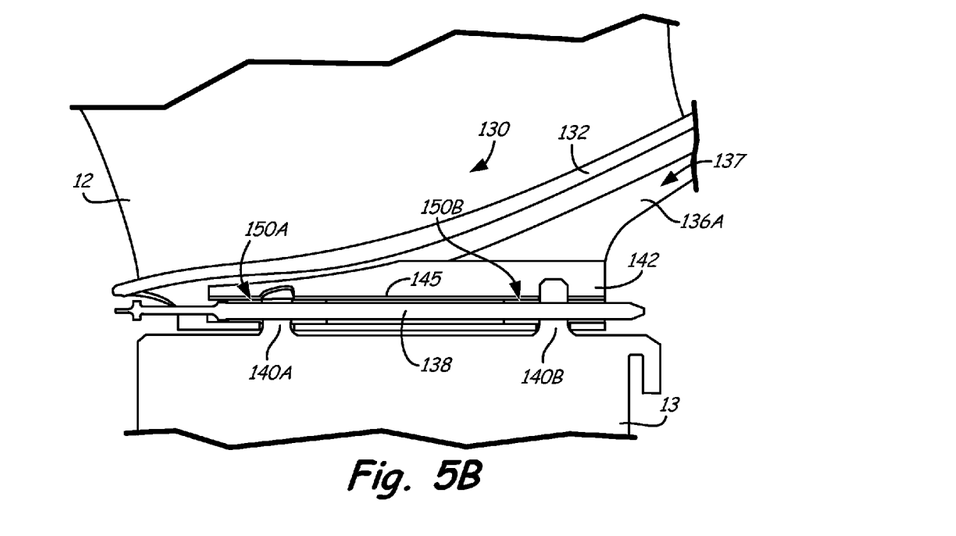

FIGS. 5A and 5B show cross-sectional views of one embodiment of fairing assembly 30 with portions of gas turbine engine 10 (FIG. 1) such as spinner 44 and shoulder 46 (FIGS. 3A and 3B) removed. Fairing assembly 130 includes outer wall 132, seals 134, first side wall 136A and second side wall (not shown), cavity 137, and single saddle 142. FIGS. 5A and 5B additionally show pin 138 and tabs 140A and 140B.

Outer wall 132 extends to seals 134 along blade 12. First side wall 136A connects to outer wall 132 and extends away from blade 12 toward pin 138 and hub 13. Together, outer wall 132, first side wall 136A and second side wall (not shown) form open cavity 137 that extends from a forward portion of hub 13 to an aft portion of hub 13. Pin 138 extends through cavity 137 from a forward portion of hub 13 to an aft portion of hub 13.

As shown in FIGS. 5A and 5B, first side wall 136A does not contact a rim of hub 13 but is supported at a distance therefrom by single saddle 142 and pin 138. In particular, single saddle 142 is designed to mount around tabs 140A and 140B and receive pin 38 therein. Thus, pin 138 extends through single saddle 142. Saddle 142 is disposed within cavity 137 about tabs 140A and 140B. Single saddle 142 is connected to first side wall 136A as well second side wall (not shown).

In one embodiment, saddle 142 is a single structure that extends from a forward portion of the cavity 137 to a rear portion of the cavity 137. Saddle 142 is integral to and co-molded with first side wall 136A and second side wall (not shown). Thus, saddle 142 is incorporated into first side wall 136A and second side wall (not shown) and saddle 142 is comprised of substantially the same materials as first side wall 136A and second side wall (not shown). Fairing assembly 130 along with saddle 142 is formed using known means such as resin transfer molding without additional secondary bonding of components.

Figure 6:
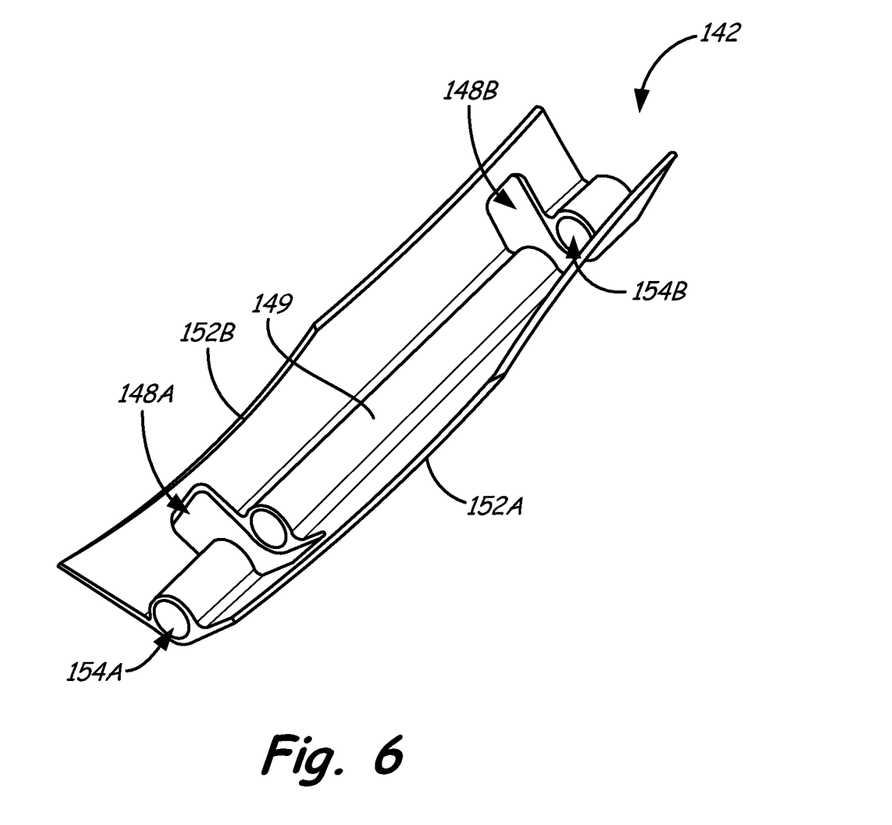
FIG. 6 is a perspective view of the saddle of FIGS. 5A and 5B.

FIG. 6 shows saddle 142. Saddle 142 includes openings 148A and 148B, central hub 149 linkages 152A and 152B, and apertures 154A and 154B.

Openings 148A and 148B extend through central hub 149 at forward and aft locations and extend through first and second ribs 150A and 150B. Linkages 152A and 152B extend in a general V-shape from central hub 149. Apertures 154A and 154B extend through central hub 149 and can be co-molded or post machined into saddle 142.

Opening 148 is adapted to receive tabs 140A and 140B (FIGS. 5A and 5B) therein. Linkages 152A and 152B are adapted to extend along and mount onto side wall 136A. Apertures 154A and 154B of central hub 149 are adapted to receive pin 138 (FIGS. 5A and 5B) therein to mount fairing assembly 130 to hub 13.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

In a further embodiment of any of the foregoing embodiments, the fairing assembly may additionally or alternatively include a hub having one or more tabs extending therefrom and each tab has an aperture therethrough, a pin is received in the aperture that extends through each tab and an aperture of the central hub to mount the fairing assembly to the hub. One or more openings in the saddle are adapted to allow the one or more tabs to extend into the cavity within the fairing assembly.

In a further embodiment of any of the foregoing embodiments, the fan assembly and/or gas turbine engine may additionally or alternatively include the fairing assembly with an outer wall, a first side wall, a second side wall, and a saddle. The first side wall and the second side wall extend from opposing sides of the outer wall. Together the first side wall, the second side wall, and the outer wall form a cavity within the fairing assembly. The saddle is positioned within the cavity and extends between the first side wall and the second side wall. The saddle has a first rib adapted to connect to the first side wall and a second rib adapted to connect to the second side wall. Together the first rib and the second rib connect together at a central hub.

In a further embodiment of any of the foregoing embodiments, the fairing assembly, fan assembly, and/or gas turbine engine may additionally or alternatively include one or more openings in the saddle are adapted to allow the one or more tabs to extend into the cavity within the fairing assembly.

In a further embodiment of any of the foregoing embodiments, the fairing assembly, fan assembly, and/or gas turbine engine may additionally or alternatively include the central hub, the first rib, the second rib have one or more openings therein.

In a further embodiment of any of the foregoing embodiments, the fairing assembly, fan assembly, and/or gas turbine engine may additionally or alternatively include the first side wall and the second side wall have one or more openings therein that are adapted to receive the one or more tabs.

In a further embodiment of any of the foregoing embodiments, the fairing assembly, fan assembly, and/or gas turbine engine may additionally or alternatively include one or more bushings disposed about the pin adjacent the one or more tabs.

In a further embodiment of any of the foregoing embodiments, the fairing assembly, fan assembly, and/or gas turbine engine may additionally or alternatively include the saddle comprises a single structure that extends from a forward portion of the cavity to a rear portion of the cavity, and the saddle is integral to and co-molded with the first side wall and the second side wall.

In a further embodiment of any of the foregoing embodiments, the fairing assembly, fan assembly, and/or gas turbine engine may additionally or alternatively include the saddle comprises a first saddle and a second saddle, the first saddle is spaced at a distance from the second saddle, and the first and second saddles comprise separately formed details that are secondarily bonded to the first side wall and the second side wall.

In a further embodiment of any of the foregoing embodiments, the fairing assembly, fan assembly, and/or gas turbine engine may additionally or alternatively include the surfaces of the first saddle and the second saddle include features which facilitate bonding of the first saddle and the second saddle to the first side wall and the second side wall.

The invention claimed is:
1. A fairing assembly comprising:
an outer wall;
a first side wall and a second side wall extending from opposing sides of the outer wall, wherein together the first side wall, the second side wall, and the outer wall form a cavity within the fairing assembly; and
a saddle disposed within the cavity and extending between the first side wall and the second side wall, wherein the saddle has a first linkage adapted to connect to the first side wall and a second linkage adapted to connect to the second side wall, and wherein the first linkage and the second linkage extend from a central hub.
2. The fairing assembly of claim 1, wherein the central hub, the first linkage, and the second linkage have one or more openings therein.

3. The fairing assembly of claim 2, further comprising:
a hub having one or more tabs extending therefrom, wherein the one or more tabs have an aperture therethrough; and
a pin received in the aperture and extending through the one or more tabs and an aperture of the central hub to mount the fairing assembly to the hub;
wherein the one or more openings in the saddle are adapted to allow the one or more tabs to extend into the cavity within the fairing assembly.

4. The fairing assembly of claim 3, wherein the first side wall and the second side wall have one or more openings therein that are adapted to receive the one or more tabs.

5. The fairing assembly of claim 3, further comprising one or more bushings disposed about the pin adjacent the one or more tabs.

6. The fairing assembly of claim 1, wherein the saddle comprises a single structure that extends from a forward portion of the cavity to a rear portion of the cavity, and wherein the saddle is integral to and co-molded with the first side wall and the second side wall.

7. The fairing assembly of claim 1, wherein the saddle comprises a first saddle and a second saddle, wherein the first saddle is spaced at a distance from the second saddle, and wherein the first and second saddles comprise separately formed details that are secondarily bonded to the first side wall and the second side wall.

8. The fairing assembly of claim 1, wherein surfaces of the saddle include features that extend along outer surfaces of first and second linkages, which facilitate bonding of the saddle to the first side wall and the second side wall.

9. A fan assembly comprising:
a hub having one or more tabs extending therefrom, wherein the one or more tabs have an aperture extending therethrough;
a pin received in the aperture and extending through the one or more tabs; and
a fairing assembly mounted to the hub, the fairing assembly comprising:
an outer wall;
a first side wall and a second side wall extending from opposing sides of the outer wall, wherein the first side wall, the second side wall, and the outer wall together form a cavity within the fairing assembly; and
one or more saddles that are adapted to receive both the one or more tabs and the pin to mount the fairing assembly to the hub, wherein one or more openings in each of the one or more saddles are adapted to allow the one or more tabs to extend into the cavity within the fairing assembly, and wherein the one or more saddles are disposed within the cavity and extend between the first side wall and the second side wall, and wherein each of the one or more saddles has a first linkage adapted to connect to the first side wall and a second linkage adapted to connect to the second side wall, and wherein the first linkage and the second linkage extend from a central hub.

10. The assembly of claim 9, further comprising a plurality of fan blades mounted to the hub, wherein the fairing assembly is disposed between adjacent fan blades adjacent the hub.

11. The fan assembly of claim 9, wherein the first side wall and the second side wall have one or more openings therein that are adapted to receive the one or more tabs.

12. The fan assembly of claim 9, wherein the one or more saddles comprise a single structure that extends from a forward portion of the cavity to a rear portion of the cavity, and wherein the one or more saddles are integral to and co-molded with the first side wall and the second side wall.

13. The fan assembly of claim 9, wherein the one or more saddles comprise a first saddle and a second saddle, wherein the first saddle is spaced at a distance from the second saddle, and wherein the first and second saddles comprise separately formed details that are secondarily bonded to the first side wall and the second side wall.

14. The fan assembly of claim 13, wherein and the second saddles include features that extend along outer surfaces thereof which facilitate bonding of the first saddle and the second saddle to the first side wall and the second side wall.

15. The fan assembly of claim 9, wherein the one or more saddles include features that extend along outer surfaces thereof which facilitate bonding of the one or more saddles to the first side wall and the second side wall.

16. A gas turbine engine comprising:
a fan hub having one or more tabs extending therefrom, wherein the one or more tabs have an aperture extending therethrough;
a pin received in the aperture and extending through the one or more tabs; and
a fairing assembly mounted to the fan hub, the fairing assembly comprising:
an outer wall;
a first side wall and a second side wall extending from opposing sides of the outer wall, wherein the first side wall, the second side wall, and the outer wall together form a cavity within the fairing assembly; and
one or more saddles that are adapted to receive both the one or more tabs and the pin to mount the fairing assembly to the hub, wherein one or more openings in each of the one or more saddles are adapted to receive the one or more tabs, and wherein the one or more saddles are disposed within the cavity and extend between the first side wall and the second side wall, and wherein each of the one or more saddles has a first linkage adapted to connect to the first side wall and a second linkage adapted to connect to the second side wall, and wherein the first linkage and the second linkage extend from a central hub.

17. The gas turbine engine of claim 16, further comprising a plurality of fan blades mounted to the hub, wherein the fairing assembly is disposed between adjacent fan blades adjacent the hub.

* * * * *